US012636830B2

(12) United States Patent
Zamani

(10) Patent No.: US 12,636,830 B2
(45) Date of Patent: May 26, 2026

(54) 3-D PRINTER APPARATUS

(71) Applicant: NISSAN NORTH AMERICA, INC., Franklin, TN (US)

(72) Inventor: Somayeh Zamani, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 413 days.

(21) Appl. No.: 18/323,353

(22) Filed: May 24, 2023

(65) Prior Publication Data

US 2024/0391169 A1 Nov. 28, 2024

(51) Int. Cl.

| | |
|---|---|
| ***B29C 64/245*** | (2017.01) |
| ***B29C 64/255*** | (2017.01) |
| ***B29C 64/264*** | (2017.01) |
| ***B29C 64/379*** | (2017.01) |
| ***B33Y 30/00*** | (2015.01) |
| *B33Y 40/20* | (2020.01) |

(52) U.S. Cl.

CPC .......... *B29C 64/245* (2017.08); *B29C 64/264* (2017.08); *B29C 64/379* (2017.08); *B33Y 30/00* (2014.12); *B33Y 40/20* (2020.01)

(58) Field of Classification Search

CPC ... B29C 64/245; B29C 64/264; B29C 64/379; B29C 64/124; B29C 64/255; B33Y 10/00; B33Y 30/00; B33Y 40/20; C03C 2217/00; G02B 1/18

See application file for complete search history.

(56) References Cited

U.S. PATENT DOCUMENTS

2016/0193786 A1* 7/2016 Moore .................. B29C 64/135 425/162
2021/0362117 A1* 11/2021 Li ........................ C09D 5/1687

OTHER PUBLICATIONS

Liang et al. ("Janus Colloids toward Interfacial Engineering", Langmuir, vol. 34, pp. 4123-4131, 2018) (Year: 2018).*
Yang, Shikuan, et al., Microfluidic synthesis of multifunctional Janus particles for biomedical applications, Lab on a Chip 12.12 (2012): 2097-2102.
Nisisako, Takasi, Recent advances in microfluidic production of Janus droplets and particles, Current opinion in colloid & interface science 25 (2016).
Yajun Liu et al., Dual-Functionalized Janus Mesoporous Silica Nanoparticles with Active Targeting and Charge Reversal for Synergistic Tumor-Targeting Therapy, ACS Appl. Mater. Interfaces 2019, 11, 47, 44582-44592.

(Continued)

*Primary Examiner* — Galen H Hauth
*Assistant Examiner* — Baileigh Kate Darnell
(74) *Attorney, Agent, or Firm* — Spencer Fane, LLP

(57) ABSTRACT

A 3-D printer apparatus has a tank that includes a bottom wall and a printing area that is located above and spaced apart from the bottom wall. At least a portion of the tank is filled with a polymerizable resin used to print an object within the printing area. The bottom wall is transparent and defines an upper surface. A layer of Janus particles overlays the upper surface of the bottom wall. Each of the Janus particles has a hydrophobic side and a hydrophilic side, with the hydrophilic side directly overlaying the upper surface of the bottom wall. The layer of Janus particles defines a barrier that prevents small bits of cured polymerizable resin within the tank from becoming attached to the upper surface of the bottom wall during the printing process.

19 Claims, 4 Drawing Sheets

(56) References Cited

OTHER PUBLICATIONS

Victoria Lopez et al., Janus Mesoporous Silica Nanoparticles for Dual Targeting of Tumor Cells and Mitochondria, ACS Appl. Mater. Interfaces 2017, 9, 32, 26697-26706.

Hou, Yajie, et al., Amphiphilic Janus particles for efficient dispersion of oil contaminants in seawater, Journal of colloid and interface science 556 (2019).

* cited by examiner

3-D PRINTER APPARATUS

BACKGROUND

Technical Field

The present disclosure generally relates to a 3-D printer apparatus. More specifically, the present disclosure relates to a 3-D printer apparatus that includes a tank having a layer of Janus particles overlaying an upper surface of a bottom wall of the tank.

Background Information

Many 3-D printers have a tank with a resin curing device, such as a light emitting device, positioned under the tank. The resin curing device is typically controlled to emit a predetermined light frequency or light frequencies in specific locations within the tank in order to cure (harden) a polymerizable resin material within the tank thereby forming an object. A common problem in many 3-D printers is that small bits of polymerizable resin material are hardened that are not part of the object being printed. Such small bits of polymerizable resin material fall to the upper surface of a bottom wall of the tank as debris that collects on the upper surface of the bottom wall. Such debris can have a negative effect on the efficiency of the resin curing device.

SUMMARY

One object of the present disclosure is to provide an upper surface of a bottom wall of a tank of a 3-D printer apparatus with a layer of Janus particles that prevent the accumulation of debris from collecting on the upper surface of the bottom wall of the tank.

In view of the state of the known technology, one aspect of the present disclosure is to provide a 3-D printer apparatus with a tank, an object carrier, a carrier movement device, a resin curing device, a polymerizable resin, a layer of Janus particles and an electronic controller. The tank has a bottom wall and a printing area that is located above and spaced apart from the bottom wall. The bottom wall is transparent and defines an upper surface. The object carrier is initially located within the tank during a printing process. The carrier movement device is attached to the object carrier. The resin curing device is positioned beneath the bottom wall and configured to selectively provide light upward through the bottom wall to the printing area. The polymerizable resin fills the printing area. The layer of Janus particles overlays the upper surface of the bottom wall. The layer of Janus particles has a hydrophobic side and a hydrophilic side. The hydrophilic side directly overlays the upper surface of the bottom wall. The electronic controller controls operation of the resin curing device and the carrier movement device. The electronic controller selectively operates resin curing device to emit predetermined light spectra to predetermined locations of the printing area in order to control curing of a polymerizable resin within the tank during the printing process.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
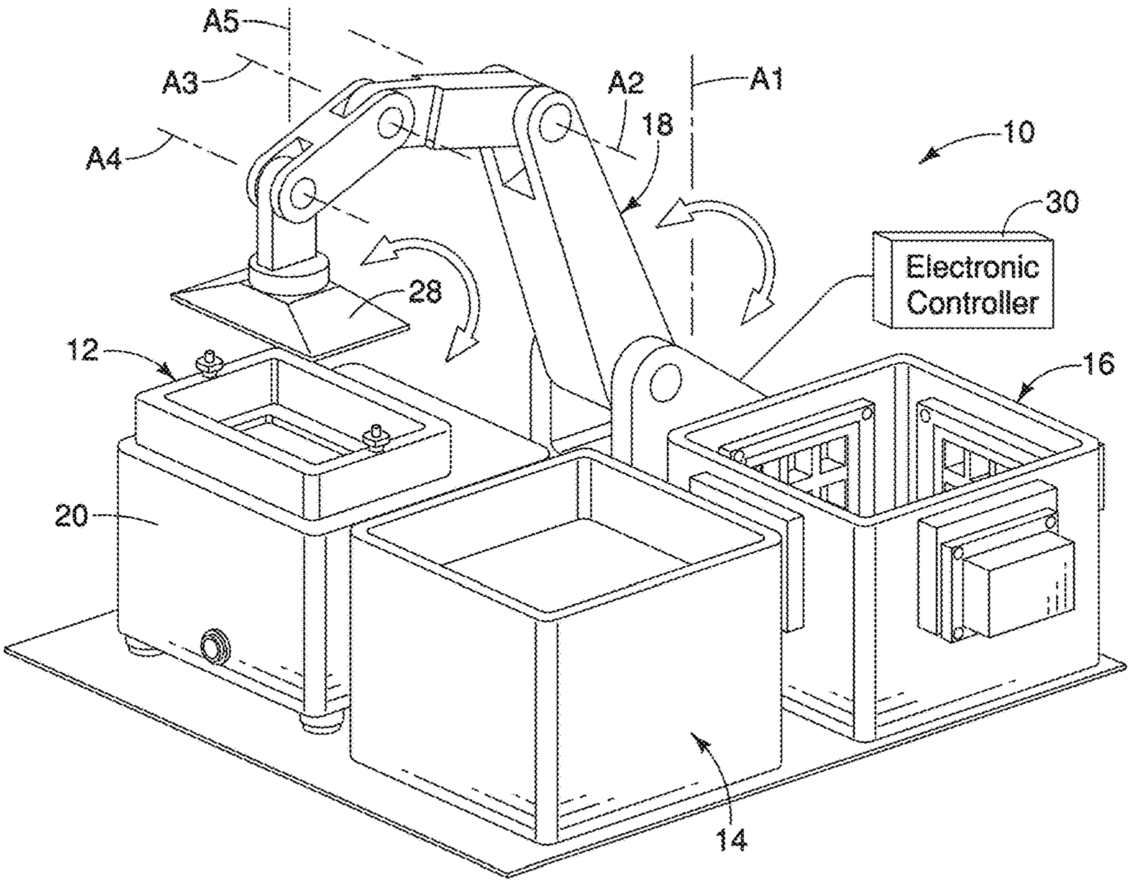
FIG. 1 is a perspective view of a 3-D printer apparatus that includes a printer assembly, a rinse station, a final curing station and a robotic arm in accordance with an exemplary embodiment.

Referring initially to FIG. 1, a three-dimensional printer apparatus 10 (also referred to as the 3-D printer 10) is illustrated in accordance with a first embodiment. The 3-D printer 10 includes a printer assembly 12, a rinse station 14, a final curing station 16 and a robotic arm 18.

As shown in FIG. 1, the 3-D printer 10 is shown with the printer assembly 12, the rinse station 14, the final curing station 16 and the robotic arm 18 as an assembled group of devices. Alternatively, the 3-D printer apparatus 10 can be separate stations that are individual units where the robotic arm 18, or a series of robotic arms are operated together in order to access and utilize the features of each of separated versions of the printer assembly 12, the rinse station 14 and the final curing station 16.

Figure 2:
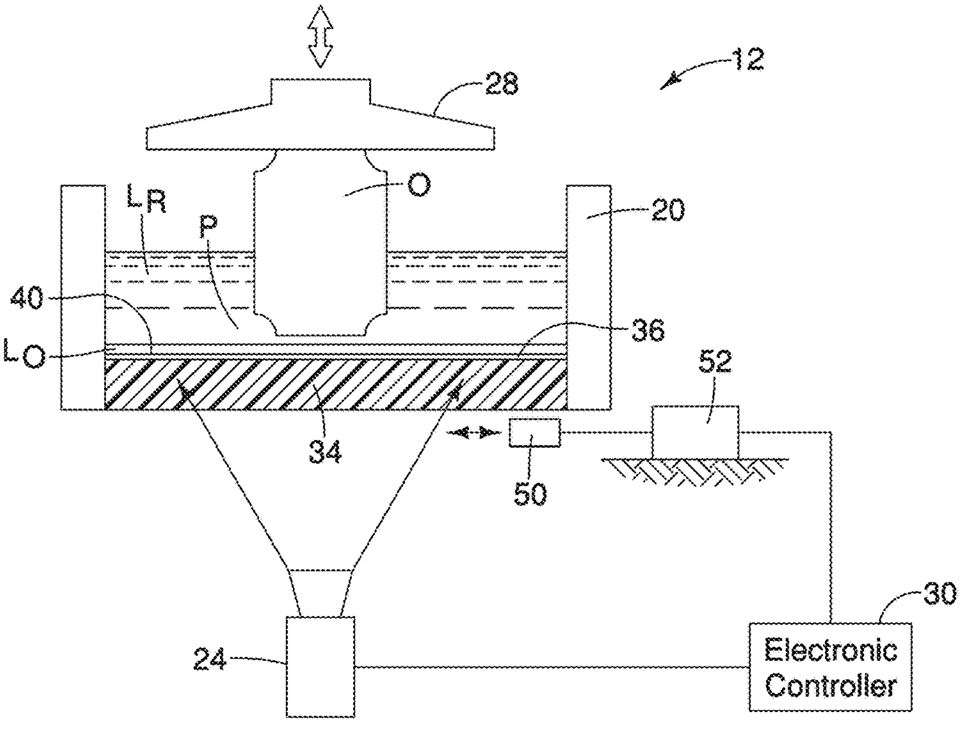
FIG. 2 is a schematic side view of the printer assembly showing an object carrier attached to the robotic arm and a tank of the printer assembly that includes a transparent bottom wall of the tank that defines an upper surface, a layer of Janus particles directly overlaying the upper surface of the bottom wall, an oil layer overlaying the Janus particles, polymerizable resin overlaying the oil layer filling a printing area below and along a bottom surface of the object carrier within the tank, a resin curing device below the bottom wall, and an object printed layer by layer onto the bottom surface of the object carrier in accordance with the exemplary embodiment.

As shown schematically in FIG. 2, the printer assembly 12 and the robotic arm 18 (also referred to as a carrier movement device) of the 3-D printer 10 work together to perform a printing process. The printer assembly 12 includes a tank 20, a resin curing device 24, an object carrier 28 connected to the robotic arm 18 and an electronic controller 30. A more detailed description of each of these portions of the printer assembly 12 is provided below.

The robotic arm 18 can be a conventional robotic mechanism that includes multiple degrees of freedom of movement. For example, the robotic arm 18 can be configured for movement about a vertical axis $A_1$, horizontal axes $A_2$, $A_3$ and $A_4$, as well as vertical axis $A_5$, as shown in FIG. 1. Consequently, the robotic arm 18 can move the object carrier 28 a multiple positioned within the tank 20 and moved out of the tank 20. It should be understood from the drawings and the description herein that the robotic arm 18 is configured for multiple degrees of freedom of movement for precise positioning of the object carrier 28 during the printing process in order to create an object O produced by the 3-D printer 10.

More specifically, the robotic arm 18 is configured to move the object carrier 28 vertically up and down within the tank 20 in small increments, such as a very small number of thousands of an inch at a time. The robotic arm 18 is further configured to move the object carrier 28 and the object O printed thereon from the tank 20 of the printer assembly 12 to the rinse station 14 and further to the final curing station 16. Since robotic arms are conventional electro-mechanical devices, further description is omitted for the sake of brevity.

The tank 20 includes side walls 32 and a bottom wall 34. The bottom wall 34 is made of a transparent material such as glass that includes silica. The bottom wall 34 that defines an upper surface 36 that is the bottom of the liquid retaining portion of the tank 20. As shown in FIG. 2, during operation of the printer assembly 12, the tank 20 is typically filled with at least two differing liquid layers, bottom layer $L_O$ and an upper layer $L_R$. The bottom layer $L_O$ is an oil that overlays the upper surface 36 of the bottom wall 34 of the tank 20. The oil layer $L_O$ can be an oxygen rich oil that prevents curing or hardening of the polymerizable resin $L_R$ (aka, the upper layer $L_R$).

The bottom layer $L_O$ is located above the bottom wall 36 and below a printing area P within the tank 20. The polymerizable resin $L_R$ (the second or upper layer) fills the printing area P and typically fills the tank 20 up to at least a level that is above a bottom surface of the object carrier 28 where the object O is initially formed.

The printing area P is located above the upper surface 36 of the bottom wall 34 of the tank 20 and below the object carrier 28. The printing area P is a general space below the object carrier 28 that is in part defined by the object O being printed by the 3-D printer 10 and the space immediately below the object O as it is formed by the selective operation of the resin curing device 24 by the electronic controller 30.

The resin curing device 24 is installed or located below the tank 20 and is positioned to selectively project predetermined light frequencies upward through transparent bottom wall 34 of the tank structure 20. The electronic controller 30 controls operation of the resin curing device 24 to emit light that cures and hardens the polymerizable resin $L_R$ (upper layer $L_R$) located within the printing area P in order to form the object O. The resin curing device 24 can be any of a variety of resin curing light sources such as an ultraviolet projector, laser (stereolithography) digital light projector, liquid crystal display, projector or other light emitting device capable of electronic focusing and imaging focused light in order to selectively cure polymerizable resin to form the object O.

In order to limit and preferably prevent any of the polymerizable resin $L_R$ from curing and/or solidifying on the upper surface 36 of the bottom wall 34 of the tank 20, the entire upper surface 36 of the bottom wall 34 is covered and/or coated by a layer 40 of Janus particles 42. The layer 40 of Janus particles 42 includes a plurality of Janus particles 42 that are spread evenly over the upper surface 36.

As is well known, Janus particles are special types of nanoparticles or microparticles whose surfaces have two or more distinct physical properties. This unique surface of Janus particles exhibits two differing chemical properties on the same particle.

In the present invention, each of the Janus particles 42 is preferably extremely small, each having an overall spherical or spherical-like shape. Each Janus particle 42 has approximately half of its surface area being provided with hydrophilic properties and the remainder being provided with hydrophobic properties.

The Janus particles 42 are transparent such that they do not interfere with the light emitted by the resin curing device 24 during the curing process that forms the object O being produced by the 3-D printer 10. The various types of Janus particles 42 that can be used with the 3-D printer 10 preferably have diameters that range between 10 nanometers to 500 micro-meters. A description of various examples of Janus particles 42 is provided below following description of the electronic controller 30.

The electronic controller 30 preferably includes a microcomputer with printer and robotic arm control programs that control the printer assembly 12 and the robotic arm 18, as discussed below. The electronic controller 32 can also include conventional components such as an input interface circuit, an output interface circuit, and storage devices such as a ROM (Read Only Memory) device and a RAM (Random Access Memory) device. The microcomputer of the electronic controller 30 is programmed to control the printer assembly 12 and the robotic arm 18. The memory circuit stores processing results and control programs such as ones for printer and robotic arm operation that are run by the processor circuit. The electronic controller 30 is operatively and/or electronically coupled to the input device(s), display (not shown), the resin curing device 28, the final curing device 16 and the robotic arm 18 in a conventional manner. The internal RAM of the electronic controller 32 stores statuses of operational flags and various control data. The internal ROM of the electronic controller 32 stores the codes and instructions for various operations. It will be apparent to those skilled in the art from this disclosure that the precise structure and algorithms for the electronic controller 32 can be any combination of hardware and software that will carry out the functions of the present invention.

As shown in FIG. 1, the object carrier 28 is attached to a distal end of the robotic arm 18 such that when the electronic controller 30 operates the robotic arm 18 to precisely position the object carrier 28 vertically as the object O is being formed by curing of a polymerizable resin $L_R$.

Operation of the printer assembly 12 via control by the electronic controller 30 is described below.

Figure 3:
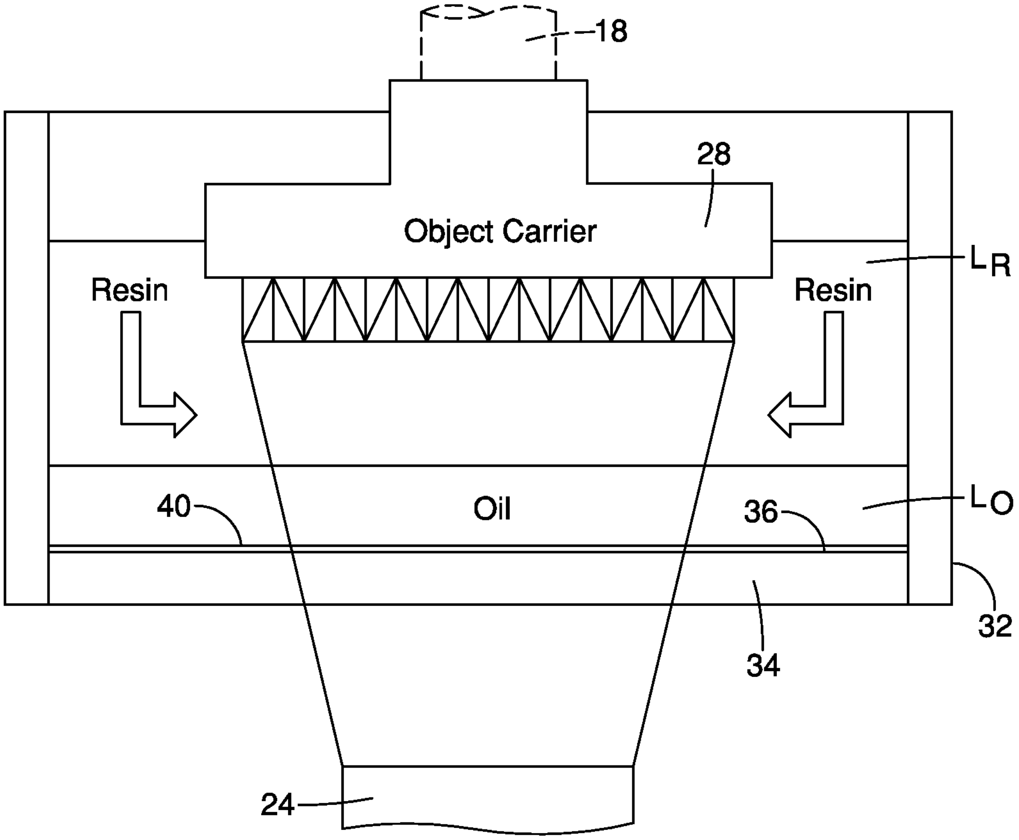
FIG. 3 is another schematic side view of the printer assembly showing the object carrier with a partially printed object thereon within the tank and the bottom wall of the tank with the layer of Janus particles on the upper surface thereof in accordance with the exemplary embodiment.

As shown in FIGS. 2 and 3, the object carrier 28 is initially positioned within the tank 20 and can be completely submerged within the polymerizable resin $L_R$. Initially, all of the polymerizable resin $L_R$ is in a liquid state. The object O to be produced by the 3-D printer apparatus 10 is formed layer by layer on an underside or bottom surface of the object carrier 28.

During the printing process, it is possible for small bits of polymerizable resin $L_R$ to solidify forming (debris) within the tank 20 separate from the polymerizable resin $L_R$ that forms object O. This debris is pulled by gravity down through the bottom layer $L_O$ (oil) adjacent to the bottom of the tank 20. In the absence of the layer 40 of Janus particles 42, this debris falls to the upper surface 36 of the bottom wall 34 of the tank 20 and can often adhere to the upper surface 36. Thereafter, the upper surface 36 must be cleaned to remove this debris. With the inclusion of the layer 40 of Janus particles 42 on the upper surface 36, no such cleaning is necessary, since the debris cannot contact the upper surface 36 and therefore cannot adhere to it. This debris can be drawn away by flow of oil, or gentle vacuuming above the layer 40 of Janus particles 42 on the upper surface 36 of the bottom wall 34 of the tank 20.

Figure 4:
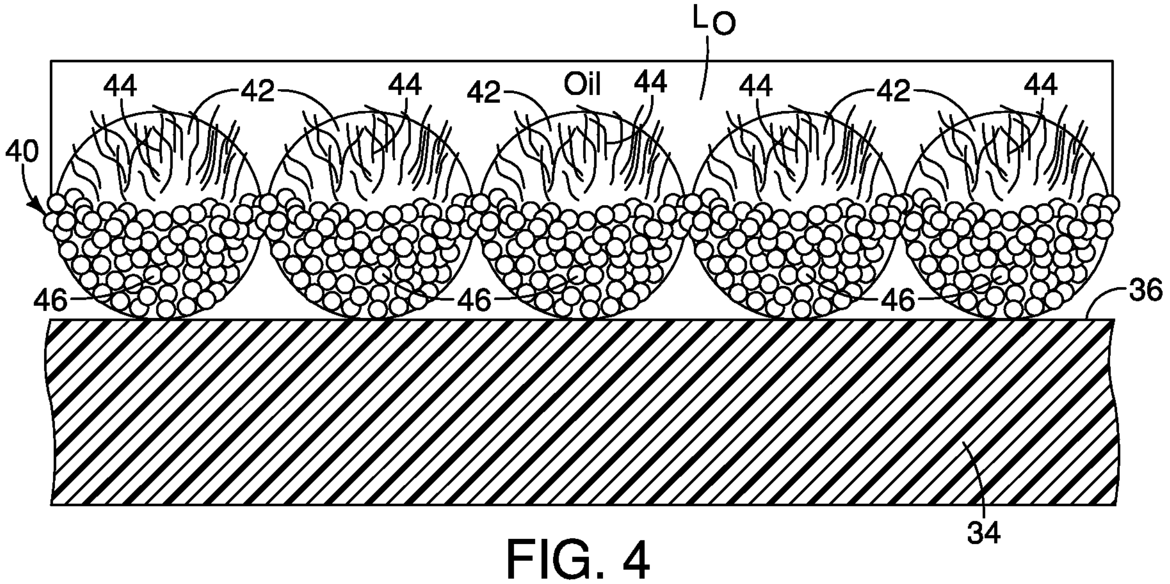
FIG. 4 is a side schematic cross-sectional view of the bottom wall of the tank with the layer of Janus particles overlaying the upper surface of the bottom wall, with oil overlaying the Janus particles in accordance with the exemplary embodiment.

As mentioned above, the layer 40 of Janus particles 42 overlays the upper surface 36 of the bottom wall 34 of the tank 20, as shown in FIG. 4. Each of the Janus particles 42 of the layer 40 of Janus particles 42 has a hydrophobic side 44 and a hydrophilic side 46, the hydrophilic side 46 directly overlaying the upper surface 36 of the bottom wall 34 with the hydrophobic side 44 facing upward.

In the preferred embodiment, hydrophilic functional groups/materials on the hydrophilic side 46 of the Janus particles 42 can chemically bond to the upper surface 36 of the bottom wall 34.

The Janus particles 42 of the layer 40 used on the upper surface 36 are preferably all the same type of Janus particles. Consequently, the layer 40 is uniform and homogenous and is preferably a generally uniform thickness along the upper surface 36.

The Janus particles 42 of the layer 40 of Janus particles 42 are all identical. However, different types of Janus particles 42 can be employed, so long as the layer 40 is composed of a single type of Janus particles 42. The Janus particles 42 can be selected from any of a variety of types of Janus particles, as described further below.

One example of Janus particles 42 can be made using variations of the various techniques set forth in Yang, Shikuan, et al. *Lab on a Chip* 12.12 (2012): 2097-2102, and Nisisako, Takasi. *Current opinion in colloid & interface science* 25 (2016): 1-12. These references disclose general techniques for making Janus particles but, require modifications in order to produce Janus particles having one hemisphere with hydrophilic chemical properties and the remainder of each Janus particle having hydrophobic chemical properties. The techniques disclosed include forming Janus particles using continuous microfluidic synthesis where a microfluidic device introduces a first monomer and a second differing monomer that are joined together to form Janus droplets that are thereafter cured to solidify the Janus droplets into Janus particles.

Figure 5:
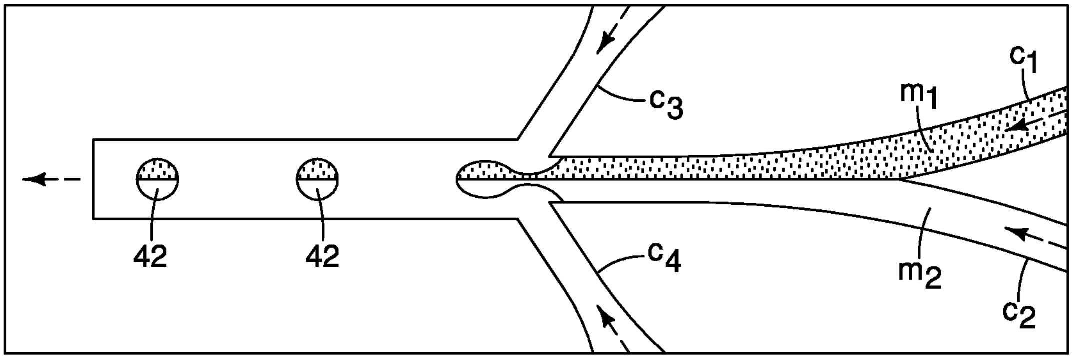
FIG. 5 is a schematic top view of a device used in a process for making Janus particles in accordance with the exemplary embodiment.

In order to produce the Janus particles 42, the first monomer and the second differing monomer disclosed in the Yang reference and/or the Nisisako reference, are replaced with a hydrophilic monomer or hydrophilic polymer M1 and a hydrophobic monomer or hydrophobic polymer M2. M1 and M2 are introduced via respective channels C1 and C2 into a flow stream. Side channels C3 and C4 at an angle of 135 degrees relative to the flow stream, contain a sodium dodcylsulfate (SDS) aqueous solution acting as sheath flows toward monomers and polymers M1 and M2 and separates them into Janus droplets, as shown in FIG. 5. Janus droplets are produced and are then subjected to a UV Source (not shown in FIG. 5) downstream of the channels C3 and C4 for rapid polymerization.

Figure 6:
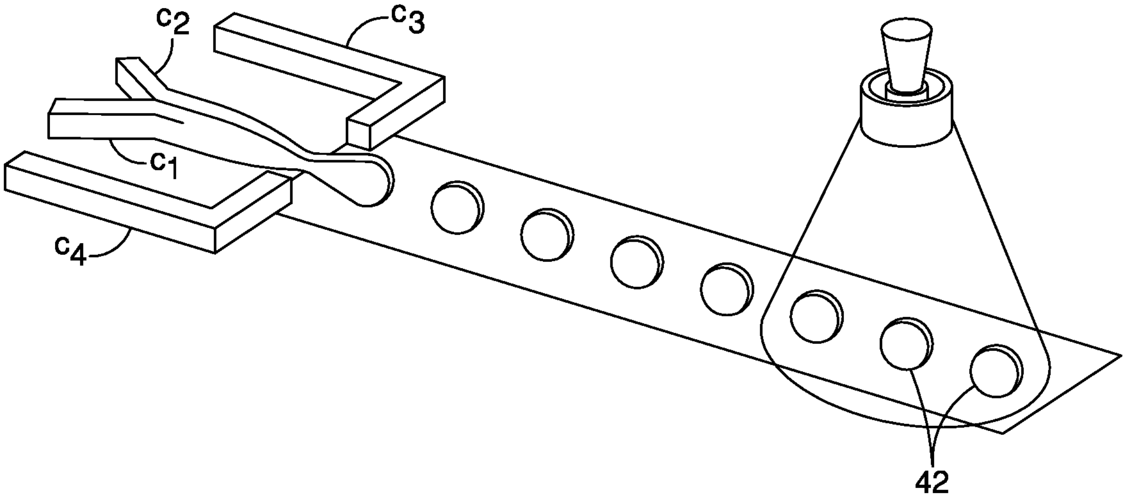
FIG. 6 is a schematic perspective view of a modified version of the device depicted in FIG. 5 used in the process for making Janus particles in accordance with the exemplary embodiment.

As shown in FIG. 6, a variation of the above technique includes the Janus droplets being composed hydrophilic monomer or polymer M1 and hydrophobic monomer or polymer M2. The aqueous solutions are fed to the flow stream through channels C3 and C4 at 90 angles relative to the flow of Janus droplets in order to separate the Janus droplets. Varying flow conditions in each channel C3 and C4, ternary-structure Janus particles can be prepared and rapidly cured via the UV source depicted in FIG. 6.

Using the techniques described in Yang, Shikuan, et al. *Lab on a Chip* 12.12 (2012): 2097-2102, and Nisisako, Takasi. *Current opinion in colloid & interface science* 25 (2016): 1-12, with the above modifications, Janus particles having a diameter of between 50 and 100 nm (nano meters) can be produced.

Yang, Shikuan, et al. *Lab on a Chip* 12.12 (2012): 2097-2102, and Nisisako, Takasi. *Current opinion in colloid & interface science* 25 (2016): 1-12, are both incorporated herein by reference in their entirety.

In the examples in Yang and Nisisako, silica spheres (silica base particles) can alternatively be used as a core to produce the Janus particles 42 covering one side with a hydrophilic monomer or polymer and covering the opposite side of the silica base with a hydrophobic side. Hydrophilic and hydrophobic chains are bonded to the opposite sides of each of the silica spheres to form another example of the Janus particles 42. When produced on silica spheres that are approximately 330 nanometers in diameter, the resulting Janus particles are between 350-380 nanometers in diameter.

The bond between the glass of the upper surface 36 of the bottom wall 34 of the tank 20 and the Janus particles 42 is a chemical bond between the hydrophilic portion of each Janus particle 42 and the silica of the upper surface of the bottom wall 34. The hydrophilic portion of each Janus particle 42 can include bonding groups, such as, OH groups, a $NH_2$ groups and COOH groups that adhere to the silica of the glass of the upper surface 36 of the bottom wall 34 using any of a variety of agents. Further examples of bonding agents include Silane coupling agents KH-550 and KH 560, both produced and marketed by Hangzhou Feidian Chemical Col LTD., Hangzhou, China.

The hydrophobic portion 44 of each Janus particles 42 (with a silica base) can be formed using any one of the following different hydrophobic moieties:

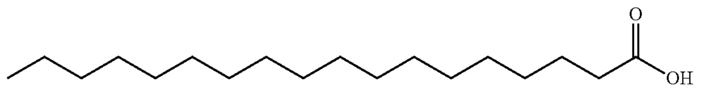

Stearic acid

-continued

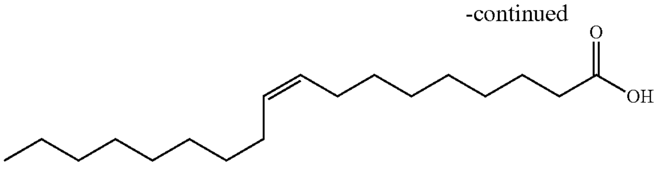

Oleic acid

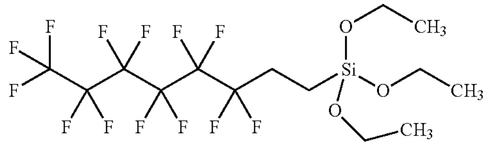

Fluorinated silanes
1H,1H,2H,2H-Perfluorooctyltriethoxysilane

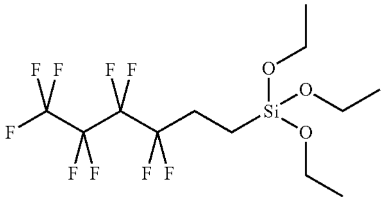

Nanofluorohexyltriethoxysilane and

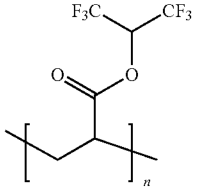

Fluoro acrylates:
(1,1,1,3,3,3-hexafluoro isopropylacrylate)

The hydrophilic portion 46 of each Janus particles 42 (with a silica base) can be formed using any one of the following different hydrophilic moieties: (3-Glycidoxypropyl) trimethoxysilane; 3-Aminopropyltriethoxysilane; Polyacrylamide Polyvinyl alcohol; Phosphate functional group; or Hydroxyl and Amine functional groups.

Figure 7:
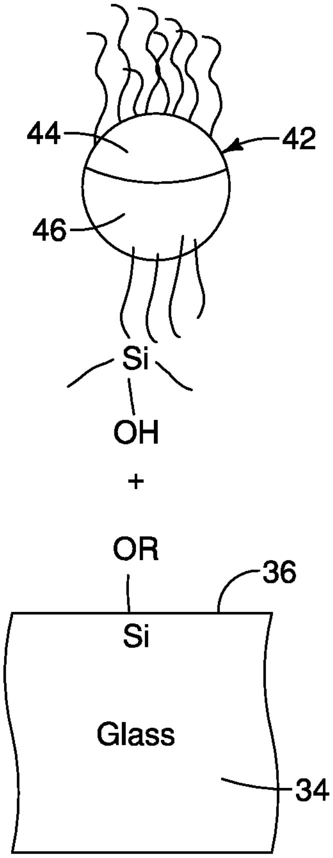
FIG. 7 is a schematic representation of formation of a chemical bond between a Janus particle and the upper surface of the bottom (glass) wall of the tank in accordance with the exemplary embodiment.
Figure 8:
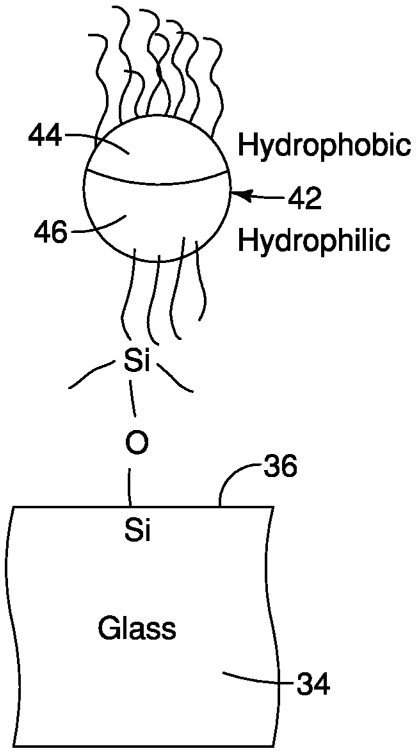
FIG. 8 is a schematic representation of the chemical bond formed between the Janus particle and the upper surface of the bottom (glass) wall of the tank in accordance with the exemplary embodiment.
Figure 9:
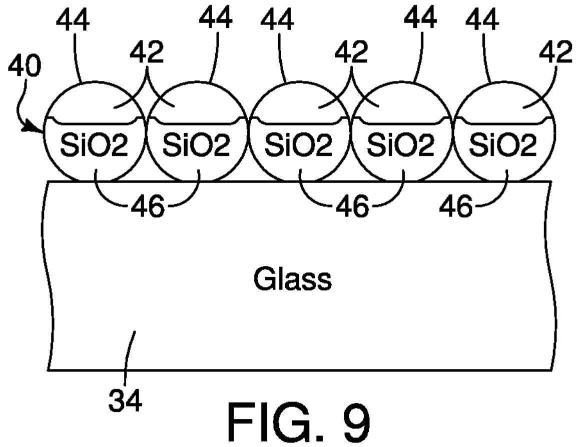
FIG. 9 is a schematic representation of a plurality of Janus particles chemically bonded to the upper surface of the bottom (glass) wall of the tank in accordance with the exemplary embodiment.

The upper surface 36 of the bottom wall 34 having silica can include an oxygen linked carbon radical that chemically bonds with the hydrophilic portion of each Janus particle 42, as depicted in FIGS. 7 and 8. Such attachments yield the layer 40 of Janus particles 42 shown in FIG. 9.

Yang, Shikuan, et al. *Lab on a Chip* 12.12 (2012): 2097-2102, and Nisisako, Takasi. *Current opinion in colloid & interface science* 25 (2016): 1-12, further disclose techniques for forming such Janus particles on the outer surface of iron oxide nanoparticles (smaller than 50 nanometers) in addition to the techniques for producing Janus particles 42. Such iron-based Janus particles are typically approximately 50 nanometers.

Iron based Janus particles provide a unique advantage. The iron-based Janus particles respond to the presence of magnetic fields. An optional magnet 50 (FIG. 2) supported by a movement device 52 can be installed below the tank 20 and moved from side to side beneath the tank 20 smoothing out and evenly distributing the Janus particles on the upper surface 36 of the bottom wall 34 of the tank 20. The movement device 52 is directly connected to the electronic controller 30. The electronic controller 30 is configured and programed to control movement of the magnet 50 such that movement of the magnet can also cause movement of the Janus particles of the layer 40 of Janus particles 42 along the upper surface 36 of the bottom wall 34 thereby cleaning the upper surface 36.

Figure 10:
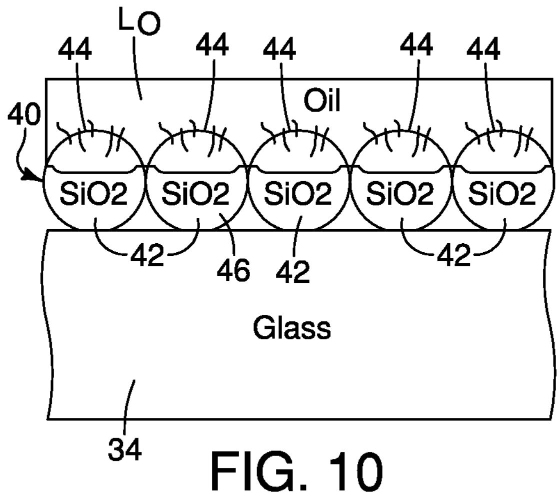
FIG. 10 is a schematic representation of a hairy hydrophobic side of the Janus particles that allow an oil layer to permeate the hydrophobic side of the Janus particles in accordance with the exemplary embodiment.

Further, Janus particles formed on an iron base core can include hydrophilic segments like PEG (polyethylene glycol) coated on the magnetic nanoparticles producing a hairy architecture that prevent clusters of Janus particles from forming (prevents agglomeration of the Janus particle) ensuring a stable dispersion of the Janus particles 42 in the layer 40 (see FIG. 10). Further, usage of magnetic force on the Janus particles can be moved providing a stirring action which can reduce the viscosity of the polymerizable resin $L_R$.

Further, hairy architecture of the hydrophobic sides 44 of the Janus particles 42 allows the oil (bottom layer $L_O$) to saturate hydrophobic fibers of the hydrophobic sides 44 providing further protection of the upper surface 36 of the bottom wall 34 of the tank 20. Put another way, the hairy architecture of the hydrophobic side 44 of each Janus particle 42 attracts the oil and prevents cured bits of polymerizable resin $L_R$ from contacting the upper surface 36 of the upper surface 36 of the bottom wall 34 of the tank 20.

There are further methods for producing Janus particles that can be used to produce the hydrophilic and hydrophobic Janus particles 42 for the 3-D printer 10.

For example, *ACS Appl. Mater. Interfaces* 2019, 11, 47, 44582-44592 and *ACS Appl. Mater. Interfaces* 2017, 9, 32, 26697-26706 disclose methods of producing Janus particles using a pickering emulsion or wax in a water emulsion to create Janus particles.

Both *ACS Appl. Mater. Interfaces* 2019, 11, 47, 44582-44592 and *ACS Appl. Mater. Interfaces* 2017, 9, 32, 26697-26706 are incorporated herein by reference in their entirety. The techniques and processes disclosed in each of *ACS Appl. Mater. Interfaces* 2019, 11, 47, 44582-44592 and *ACS Appl. Mater. Interfaces* 2017, 9, 32, 26697-26706, can be modified such that a hydrophobic side and a hydrophilic side can be formed on opposite sides of each Janus particle produced.

Using the pickering emulsion or wax in a water emulsion, nanoparticles accumulate around a wax particle (a paraffin particle) and the parts of the particles facing out can be treated and functionalized with a hydrophobic group, monomer or polymer. Thereafter, removing the wax droplets/particles on opposite side of the nanoparticles are ready for a hydrophilic group, monomer or polymer. The resulting the Janus particles each include a paraffin base core.

In the above examples of differing types of Janus particle produced with a hydrophobic side and a hydrophilic side, the subsequent layer of Janus particles 42 of the layer 40 interact with the oil layer $L_O$ repelling the polymerizable resin layer $L_R$ thereby preventing attachment of the polymerizable resin with the upper surface 36 of the bottom wall 34 of the tank 20.

The layer 40 of Janus particles 42 can be chemically bonded to the upper surface 36 of the bottom wall 34. Such particles are prevented from movement by any suction force caused by polymerization of the polymerizable resin in the layer $L_R$. In the case of Janus particles with iron, magnetism can retain the Janus particles in place on the upper surface 36 of the bottom wall 34 of the tank 20.

An alternative configuration of the contents of the tank 20 can include elimination of the bottom layer $L_O$ of oil where the polymerizable resin $L_R$ directly overlays and covers the layer 40 of Janus particles 42. The polymerizable resin $L_R$ further fills space between the layer of Janus particles and the object carrier. The polymerizable resin $L_R$ overlaying and covering the layer 40 of Janus particles 42 inhibits the polymerizable resin $L_R$ from crosslinking (curing) on the upper surface 36 of the bottom wall 34 of the tank 20. Further, in the absence of the oil layer $L_O$, the hydrophobic chains on upper surface of Janus particles 42 repel the polymerizable resin $L_R$.

Alternatively, the use of Janus particles with an iron core or iron molecules provide these micrometer sized Janus particles with a response to magnetic forces. Magnetic Janus particles can be used to exclude the oil layer and by vibrating the 50 magnet below the glass (bottom wall 34). Similarly, should debris from cured bits of the polymerizable resin make its way to the upper surface 36 of the bottom wall 34, vibration of the magnet 50 can cause vibrating movement of the Janus particles to assure the separation of resin from the glass of the upper surface 36 of the bottom wall 34.

Hou, Yajie, et al., *Journal of colloid and interface science* 556 (2019): 54-64, further discloses amphiphilic Janus particles prepared by treating half of silica particles to form amphiphilic Janus particles. Modifying the disclosed process by treating half of the silica particles with a hydrophobic moiety forms Janus particles that are suitable for use with the 3-D printer 10. Hou, Yajie, et al., *Journal of colloid and interface science* 556 (2019): 54-64 is incorporated by reference herein in its entirety. Silica particles are hydrophilic due to OH groups on the surface. By treatment of half of the particle with a hydrophobic moiety, the desired Janus silica particle can be prepared for use in the 3-D printer 10 on the upper surface 36 of the bottom wall 34 of the tank 20.

The 3-D printer apparatus includes many conventional components that are well known in the art. Since such components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the three-dimensional printer apparatus. Accordingly, these terms, as utilized to describe the present invention should be interpreted relative to a vehicle equipped with the three-dimensional printer apparatus.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A 3-D printer apparatus, comprising:

a tank having bottom wall and a printing area that is located above and spaced apart from the bottom wall, the bottom wall being transparent and defining an upper surface;

an object carrier initially located within the tank during a printing process;

a carrier movement device attached to the object carrier;

a resin curing device positioned beneath the bottom wall and configured to selectively provide light upward through the bottom wall to the printing area;

a polymerizable resin filling the printing area;

a layer of Janus particles chemically bonded to the upper surface of the bottom wall, the layer of Janus particles having a hydrophobic side and a hydrophilic side; and an electronic controller controlling operation of the resin curing device and the carrier movement device, the electronic controller selectively operating resin curing device to emit predetermined light spectra to predetermined locations of the printing area in order to control curing of a polymerizable resin within the tank during the printing process.

2. The 3-D printer apparatus in accordance with claim 1, wherein the hydrophilic side of each of the Janus particles of the layer of Janus particles includes a coupling agent.

3. The 3-D printer apparatus in accordance with claim 2, wherein the coupling agent of the hydrophilic side of each of the Janus particles of the layer of Janus particles is a silane coupling agent.

4. The 3-D printer apparatus in accordance with claim 1, wherein each of the Janus particles of the layer of Janus particles includes a silica base particle.

5. The 3-D printer apparatus in accordance with claim 1, wherein each of the Janus particles of the layer of Janus particles includes a paraffin base core.

6. The 3-D printer apparatus in accordance with claim 1, wherein each of the Janus particles of the layer of Janus particles includes an iron base core.

7. The 3-D printer apparatus in accordance with claim 6, wherein the electronic controller is configured to control movement of a magnet such that movement of the magnet causes movement of the Janus particles of the layer of Janus particles along the upper surface of the bottom wall thereby cleaning the upper surface.

8. The 3-D printer apparatus in accordance with claim 1, wherein the hydrophobic side of each of the Janus particles of the layer of Janus particles includes a hydrophobic moiety selected from a group consisting of: a stearic acid, an oleic acid, a fluorinated saline, and a fluoro acrylate.

9. The 3-D printer apparatus in accordance with claim 1, further comprising an oil within the tank below the printing area and covering the layer of Janus particles overlaying the upper surface of the bottom wall.

10. The 3-D printer apparatus in accordance with claim 9, further comprising a polymerizable resin overlaying the oil and filling space between the oil and the object carrier including the printing area.

11. The 3-D printer apparatus in accordance with claim 10, wherein the layer of Janus particles interacts with the oil repelling the polymerizable resin thereby preventing attachment of the polymerizable resin with the upper surface of the bottom wall of the tank.

12. The 3-D printer apparatus in accordance with claim 10, wherein the layer of Janus particles is chemically bonded to the upper surface of the bottom wall.

13. The 3-D printer apparatus in accordance with claim 12, wherein the layer of Janus particles being chemically bonded to the upper surface of the bottom wall are prevented from movement by suction force caused by polymerization of the polymerizable resin.

14. The 3-D printer apparatus in accordance with claim 1, further comprising a polymerizable resin overlaying and covering the layer of Janus particles fills space between the layer of Janus particles and the object carrier.

15. The 3-D printer apparatus in accordance with claim 14, wherein the layer of Janus particles inhibits the polymerizable resin from crosslinking on the upper surface of the bottom wall of the tank.

16. The 3-D printer apparatus in accordance with claim 1, wherein the hydrophilic side of the layer of Janus particles is in direct contact with the upper surface of the bottom wall.

17. The 3-D printer apparatus in accordance with claim 1, wherein each of the Janus particles of the layer of Janus particles is transparent.

18. The 3-D printer apparatus in accordance with claim 1, wherein each of the Janus particles of the layer of Janus particles has a spherical shape with a first hemisphere provided with hydrophilic properties and a second hemisphere provided with hydrophobic properties.

19. The 3-D printer apparatus in accordance with claim 1, wherein the bottom wall is formed of a glass material, and the hydrophilic side of the layer of Janus particles is chemically bonded to the glass material.

* * * * *